US011449255B2

(12) United States Patent
Bhowmik et al.

(10) Patent No.: US 11,449,255 B2
(45) Date of Patent: Sep. 20, 2022

(54) SYSTEMS AND METHODS FOR SCALING VOLUMES USING VOLUMES HAVING DIFFERENT MODES OF OPERATION

(71) Applicant: NetApp, Inc., Sunnyvale, CA (US)

(72) Inventors: Sushrut Bhowmik, Bangalore (IN); Amit Panara, Bangalore (IN); Sumith Makam, Bangalore (IN); Vinay Kumar, Bangalore (IN); Varun Simhadri, Bangalore (IN); Sriram Venkataraman, Bangalore (IN)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/093,595

(22) Filed: Nov. 9, 2020

(65) Prior Publication Data
US 2022/0147257 A1    May 12, 2022

(51) Int. Cl.
*G06F 3/06* (2006.01)
*G06F 9/38* (2018.01)
*G06F 9/50* (2006.01)

(52) U.S. Cl.
CPC ............ *G06F 3/0644* (2013.01); *G06F 3/064* (2013.01); *G06F 3/0604* (2013.01); *G06F 3/0665* (2013.01); *G06F 9/3836* (2013.01); *G06F 9/5061* (2013.01); *G06F 3/0679* (2013.01)

(58) Field of Classification Search
CPC ...... G06F 3/0604; G06F 3/064; G06F 3/0644; G06F 3/0665
USPC .......................................................... 711/154
See application file for complete search history.

(56) References Cited

U.S. PATENT DOCUMENTS

| | | | |
|---|---|---|---|
| 2010/0257312 A1* | 10/2010 | Twigg .................. | G06F 3/0625 711/E12.001 |
| 2015/0186064 A1* | 7/2015 | Chen ..................... | G06F 3/0607 711/162 |
| 2019/0065078 A1* | 2/2019 | Yerfule ................. | G06F 9/4881 |

* cited by examiner

*Primary Examiner* — Than Nguyen
(74) *Attorney, Agent, or Firm* — Haynes and Boone, LLP

(57) ABSTRACT

A method, a computing device, and a non-transitory machine-readable medium for managing modes of operation for volumes in a node. A first portion of a plurality of volumes in a node is selected to operate in an active mode. A second portion of the plurality of volumes in the node is selected to operate in a passive mode. The second portion of the volumes that operates in the passive mode consumes fewer resources than the first portion of the volumes that operates in the active mode. The first portion of the plurality of volumes and the second portion of the plurality of volumes are adjusted over time based on activity of each volume of the plurality of volumes.

20 Claims, 9 Drawing Sheets

400

402
SELECT A FIRST PORTION OF A PLURALITY OF VOLUMES IN THE NODE TO OPERATE IN AN ACTIVE MODE

404
SELECT A SECOND PORTION OF THE PLURALITY OF VOLUMES IN THE NODE TO OPERATE IN A PASSIVE MODE

406
ADJUST THE FIRST PORTION OF THE VOLUMES AND THE SECOND PORTION OF THE VOLUMES BASED ON ACTIVITY OF EACH OF THE VOLUMES IN THE PLURALITY OF VOLUMES OVER TIME

FIG. 4

SYSTEMS AND METHODS FOR SCALING VOLUMES USING VOLUMES HAVING DIFFERENT MODES OF OPERATION

TECHNICAL FIELD

The present description relates to scaling volumes, and more specifically, to systems and methods for scaling volumes using volumes that have different modes of operation.

BACKGROUND

Data management services include services such as, but not limited to, capturing snapshots, mirroring, generating backups, cloning, ensuring storage efficiency, and providing storage security. Using various configurations and policies in association with these data management services may require a user to host a large number of data volumes on a storage node. This type of volume scaling, however, presents certain challenges. For example, as the number of volumes provisioned increases, volume mount time may increase (e.g., proportionately). Increased volume mount times may negatively impact failover timing. Failover may include switching to a redundant component (e.g., volume) in response to a failure or abnormal termination of a previously employed component. Further, as the number of volumes provisioned increases, the required memory footprint and cleaning overhead of dirty buffers increases. Still further, each volume in a node typically has its own background systems and is independently scheduled by a scheduling system. This scheduling may become increasingly more complex and/or more difficult as the number of volumes provisioned increases. The above-described issues may contribute to reduced overall system performance of the storage node.

BRIEF DESCRIPTION OF THE DRAWINGS

The present disclosure is best understood from the following detailed description when read with the accompanying figures.

FIG. 4 is a flow diagram of a process for managing the modes of operation for volumes within a node in accordance with one or more example embodiments.

DETAILED DESCRIPTION

Figure 1:
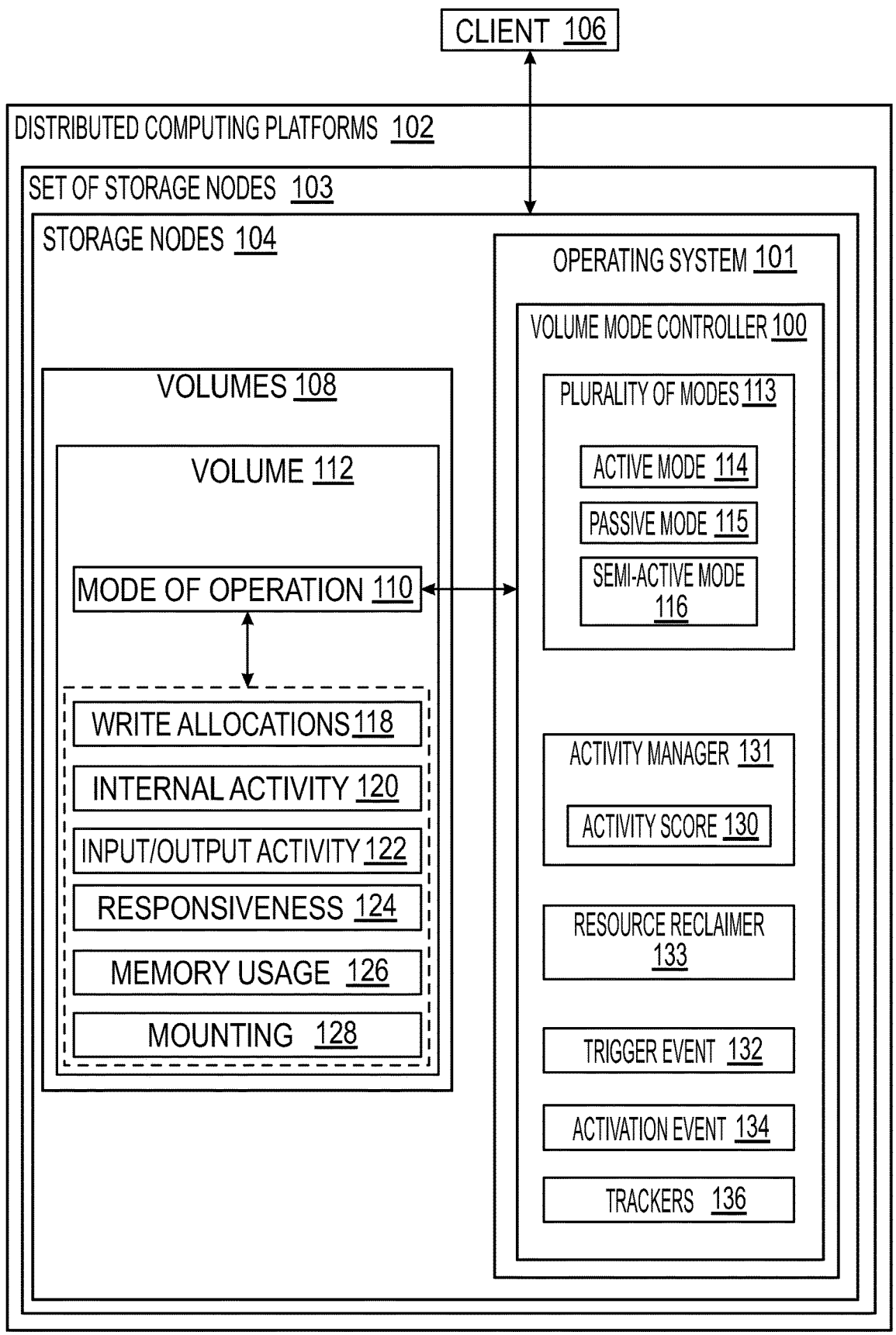
FIG. 1 is a block diagram illustrating a volume mode controller in accordance with one or more example embodiments.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

Various embodiments described herein include methods, systems, and machine-readable media (e.g., computer program products) for scaling volumes using volumes that have different modes of operations. The embodiments described herein enable scaling volumes using thin provisioning of volumes that are capable of operating with different modes of operation. In particular, the embodiments described enable managing the modes of operation for volumes within nodes (e.g., storage nodes) and limiting the number of volumes that are operating at full capacity (e.g., in a fully privileged manner) to conserve resources. In one or more embodiments, volumes operating in an active mode are fully functional and may be referred to as active volumes. Volumes that operate in a passive mode are partially functional and may be referred to as passive volumes. In some embodiments, volumes may be capable of operating in a semi-active mode that makes the volume partially functional. These volumes may be referred to as semi-active volumes. Semi-active volumes may be less functional than active volumes but more functional than passive volumes.

The number of volumes that are allowed to operate in an active mode within a node may be limited to a maximum number to ensure sufficient resources and system performance. In some cases, this limiting occurs by limiting the ratio of active volumes to passive volumes within a node to at or below a maximum ratio. In one or more embodiments, this maximum ratio is selected based on the maximum number of volumes that can be made fully functional (i.e., active) without affecting quality operating system (QOS) requirements or reducing performance outside of selected tolerances. Because a volume in passive mode uses fewer resources than a volume in active mode, this mode may also be referred to as a low-resource mode. Further, a volume in passive mode operates in a low cost and low maintenance manner as compared to when that same volume is in active mode. The flow between active mode and passive mode for the volumes in a node is controlled to provide volume scaling in a manner that meets requirements and provides improved overall system performance.

The embodiments provide methods, systems, and computer program products for managing the mode or state of the various volumes in multiple nodes of a data management system and the transitions between active mode and passive mode. In one or more embodiments, a volume in passive mode may be transitioned to active mode in response to at least one activation event occurring. The activation event may include, for example, a write request, a snapshot request, a mirror request, another type of request that requires or may be better performed with the volume being fully functional, or a combination thereof. When the activation event is detected, a mode of operation for the volume is changed (or transitioned) from the passive mode to the active mode to enable regular or normal operation with respect to that activation event.

In one or more embodiments, a volume in active mode may be transitioned to passive mode in response to a trigger event occurring. The trigger event may include, for example, an excess number of volumes being in active mode, inactivity of the volume for more than a preselected period of time, some other type of event, or a combination thereof. In various embodiments, the trigger event is an activity score for the volume dropping below a selected threshold. When at least one trigger event is detected, the mode of operation for the volume is changed from the active mode to the passive mode to reduce the resources being used by that volume and allow those resources to be used by another volume.

In this manner, resource usage within a node is conserved and allocated to those volumes with an increased need for resources, such as those with increased write activity. This type of volume provisioning enables a greater number of volumes to be supported by a single node. As one example, a single node may be capable of supporting up to and, in some cases over, 5,000 volumes. Further, such volume provisioning may allow increased overall system and computing performance because resources that might have otherwise been devoted to some nodes may be used instead for other computing or storage activities.

FIG. 1 is a block diagram illustrating a volume mode controller 100 in accordance with one or more example embodiments. The volume mode controller 100 may be implemented using hardware, software, firmware, or a combination thereof. In one or more embodiments, the volume mode controller 100 is implemented in an operating system 101. The operating system 101 is a storage operating system that may be hosted by distributed computing platform 102, may be installed in set of storage nodes 103, or both. Set of storage nodes 103 may include, for example, one or more data storage tiers, one or more data storage apparatuses, one or more data storage nodes within one or more data storage apparatuses, respectively, one or more cloud storage nodes, or a combination thereof. Examples of these different types of storage nodes are described in further detail in FIGS. 8 and 9 below.

In one or more embodiments, the operating system 101 is implemented on a storage node, such as storage node 104 of set of storage nodes 103. In some examples, the storage node 104 may take the form of an external storage array. In these examples, a client, such as a client 106, may communicate, via one or more intermediaries (e.g., one or more web services, one or more node computing devices, or a combination thereof), with the storage node 104 to create, delete, rename, or otherwise modify files that are stored in the storage node 104. For example, the client 106 may initiate any number of write requests, read requests, snapshot requests, mirror requests, copy requests, or a combination thereof.

The storage node 104 may support any number of volumes 108. These volumes 108 may also be referred to as data containers. In one or more embodiments, each of the volumes 108 is a FlexVol volume. A FlexVol volume is a volume that is loosely coupled to its containing aggregate. A FlexVol volume can share its containing aggregate with other FlexVol volumes. Thus, a single aggregate can be the shared source of all the storage used by all the FlexVol volumes contained by that aggregate. An aggregate may be, for example, a group of physical data storage resources (e.g., drives, logical unit numbers (LUNs), etc.).

Each of the volumes 108 in the storage node 104 has a mode of operation. For example, the volumes 108 may include a volume 112 having a mode of operation 110. The mode of operation 110 for the volume 112 at any given time determines the amount of resources that the volume 112 uses at that time. Further, the mode of operation 110 determines the functional capabilities (e.g., fully functional or partially functional) of the volume 112 at any given time. The mode of operation 110 is selected from a plurality of modes 113. The modes 113 may include different modes for different configurations of volume mode controller 100. In some embodiments, the modes 113 include an active mode 114 and a passive mode 115. In other embodiments, the modes 113 include the active mode 114, the passive mode 115, and a semi-active mode 116. A volume, such as volume 112, may be referred to as an active volume while in the active mode 114, as a passive volume while in the passive mode 115, and as a semi-active volume while in the semi-active mode 116.

The volume mode controller 100 manages the mode of operation for each of the volumes 108. For example, the volume mode controller 100 controls the transitions between different modes for the volumes 108. The volume mode controller 100 uses thin provisioning in conjunction with these different modes to provide volume scaling for the storage node 104 in a manner that does not overtax the storage node 104. In particular, this type of thin provisioning enables a greater number of volumes 108 to be supported by storage node 104.

When a volume, such as the volume 112, is in the active mode 114, the volume 112 operates in a fully privileged manner. In other words, the volume 112 is a fully functioning or fully operating volume. When a volume, such as volume 112, is in passive mode 115, the volume 112 operates in a partially privileged manner. In other words, the volume 112 is a partially functioning or partially operating volume. In one or more embodiments, the level of functionality or activity for the volume 112 is determined based on how the volume 112 handles write allocations 118, internal activity 120, input/output activity 122, responsiveness 124, memory usage 126, mounting 128, one or more other activities, or a combination thereof.

Write allocations 118 involve writing data to memory (e.g., adding data to data buffers/cache, etc.) and logging this write activity. This writing may be referred to as dirtying the memory. After some period of time of writing and/or after writing, the accumulated data is transferred to a physical or cloud space (e.g., written to disk). This transferring may also be referred to as cleaning the memory. The point in time at which this transfer occurs may be referred to as a "consistency point" (CP). The resources used to perform such writes and transfers may be more than desired even when the amount of data being written or transferred is small. For example, in certain cases, cleaning 1 byte of data may use the same resources as cleaning 1,000 bytes of data.

Internal activity 120 includes, for example, but is not limited to, block free processing, scans, one or more other internal background systems or subsystems, or a combination thereof. Block free processing may include, for example, but is not limited to, garbage or trash collection, cleanup, zombie processing, disk free processing, one or more other types of processing activity, or a combination thereof. Scans may include, for example, but are not limited to, defragmentation scans, background reading activity, decompression scans, directory indexing, one or more other scan processes, or a combination thereof.

Input/output activity 122 includes write activity and read activity initiated by client request. Responsiveness 124 indicates whether a volume responds to an incoming client request such as, for example, a write request, a copy (e.g., snapshot) request, or both. Memory usage 126 refers to the memory footprint of a volume. This memory footprint is determined by the amount of memory (e.g., the number of data structures) used or consumed by the volume.

Mounting 128 refers to how a volume, such as the volume 112, is mounted on a corresponding storage node when the storage node 104 belongs to a high-availability (HA) pair of storage nodes. For example, when the storage node can no longer function as desired, the partner storage node in the HA pair can take over storage node 104's storage to provide continued data services. As part of this takeover, the volumes of the storage node 104 are mounted to the partner storage node. In one or more embodiments, the current mode of operation for each of the volumes 108 in the storage node 104 at the time the storage node 104 goes down determines the prioritization of the volumes 108 with respect to mounting 128. For example, the mode of operation 110 of the volume 112 determines how quickly and/or in what order the volume 112 is mounted.

By controlling the mode of operation 110 for the volume 112 at any given point in time, the volume mode controller 100 controls how the volume 112 handles each of write allocations 118, internal activity 120, input/output activity 122, responsiveness 124, memory usage 126, and mounting 128 at that time. The volume mode controller 100 monitors the activity of the volume 112 and generates an activity score 130 for the volume 112. The volume mode controller 100 updates this activity score 130 based on how the activity of the volume 112 changes over time. In one or more embodiments, the volume mode controller 100 includes an activity manager 131 that monitors the activity of the volumes 108, generates the activity score 130, and updates the activity score 130.

The activity score 130 may depend on a number of factors. For example, the activity score 130 may take into account the amount and type of input/output activity 122 occurring, the most recent input/output action (or event) that occurred, the nature of the most recent input/output action (e.g., whether the action was a write or a read), or a combination thereof. In some examples, the activity score 130 takes into account ongoing operations such as snapshot operations, mirroring operations, etc. In some examples, the activity score 130 takes into account pending internal activity 120 (e.g., pending block free processing activities, pending scans, etc.). Different processes or activities considered part of the internal activity 120 may be weighted differently in the calculations or computations used to generate and update the activity score 130. Certain processes or activities that have been waiting or pending for longer period of times may increase the activity score 130.

In one or more embodiments, the activity score 130 is a total score that includes or is based on the combination of a write activity score and an internal activity score. In some cases, one or more other types of scores may be used to compute the total score. The write activity score may be based on a write activity portion of the input/output activity 122 for the volume 112. This write activity portion may be, for example, the number of write requests that the volume 112 has received within a certain period of time (e.g., 50 milliseconds, 1 second, 10 seconds, 20 seconds, 1 minute, 5 minutes, etc.). In some embodiments, the internal activity score is based on internal activity 120 (or background activity). In one or more embodiments, the write activity score is weighted higher than the internal activity score such that greater emphasis is placed on write activity.

In one or more embodiments, the volume mode controller 100 transitions the volume 112 from the active mode 114 to the passive mode 115 in response to a trigger event 132. The trigger event 132 may be, for example, the activity score 130 dropping below a selected threshold, an excess number of volumes being in the active mode 114, inactivity of the volume 112 for more than a preselected period of time, another type of event, or a combination thereof. In some cases, this transition process is managed and controlled by a resource reclaimer 133. In one or more examples, the resource reclaimer 133 is referred to as a scavenger.

In one or more embodiments, the volume mode controller 100 transitions the volume 112 from the passive mode 115 to the active mode 114 in response to an activation event 134. The activation event 134 may take the form of, for example, a compulsive activation event, a suggestive activation event, or both. A compulsive activation event triggers the transition from the passive mode 115 to the active mode 114 instantly (or near instantly). Examples of a compulsive activation event include, but are not limited to, an incoming write request, a request for a snapshot operation, a request for a mirror operation, a manual initiation (e.g., by a human administrator) of a scanner, some other type of event, or a combination thereof. A transition from the passive mode to the active mode 114 based on a compulsive activation event may be referred to as an "on-demand" transition.

A suggestive activation event is an event that suggests to the volume mode controller 100 that the volume 112 should be promoted from passive mode 115 to the active mode 114. In some examples, the suggestive activation event does not instantly initiate this transition. For example, a suggestive activation event may increase the activity score 130 of the volume 112, may move the volume 112 up in the queue of volumes to be transitioned to the active mode 114, or may cause the volume 112 to transition to the active mode 114 in some other manner. The suggestive activation event may be that the pending internal activity 120 meets one or more criteria. For example, the suggestive activation event may be, but is not limited to, a cleanup operation that has been pending for at least a selected period of time, an amount of garbage collection activity that has been pending for at least a selected period of time, the amount of garbage collection activity reaching a threshold activity level, another type of event, or a combination thereof.

Examples of how a volume, such as volume 112, may be transitioned between different modes of operation is described in greater detail below with respect to FIGS. 2 and 3.

In one or more embodiments, the volume mode controller 100 manages a plurality of trackers 136. These trackers 136 track various parameters corresponding to each storage node of the storage nodes 103 (e.g., storage node 104) and the volumes in each storage node (e.g., the volumes 108 in the storage node 104). The trackers 136 may include, for example, one or more counters, one or more score trackers, one or more other types of trackers, or a combination thereof.

In one or more embodiments, the trackers 136 include, for each storage node of the set of storage nodes 103, a counter for a number of active-to-passive (A2P) transitions occurring at any given point in time, a counter for a number of passive-to-active (P2A) transitions occurring at any given point in time, a tracker identifying a rate at which these different transitions are occurring, a counter for a number of active volumes, a counter for a number of passive volumes, a tracker identifying a central processing unit (CPU) overhead of the thin provisioning implemented by the volume mode controller 100, or a combination thereof. In one or more embodiments, the trackers 136 may include, for each volume in a storage node (e.g., each of the volumes 108 in the storage node 104), a score tracker that tracks the activity score (e.g., activity score 130) of that volume, a counter for a number of active-to-passive transitions that have occurred, a counter for a number of passive-to-active transitions that have occurred, or a combination thereof.

In some embodiments, the trackers 136 further include, for each active-to-passive-transition that occurs, a tracker identifying the total time taken for this transition, a tracker identifying the time taken to drain internal messages as part of this transition, a tracker identifying a volume identifier or name of the volume that underwent or is undergoing the transition, a tracker identifying the activity score (e.g., activity score 130) of the volume at the time of the transition, or a combination thereof. In some embodiments, the trackers 136 include, for each passive-to-active transition that occurs, a tracker identifying the activation event that triggered this transition, the volume identifier or name of the volume that underwent or is undergoing the transition, a tracker identifying the activity score of the volume at the time of the transition, a tracker identifying any delay that occurs with the transition due to too many volumes being in an active mode at the time of the transition, or a combination thereof.

In other embodiments, the trackers 136 may include trackers for when the modes 113 also include the semi-active mode 116. For example, the trackers 136 may include trackers for identifying information with respect to semi-active-to-active transitions, semi-active-to-passive transitions, active-to-semi-active transitions, passive-to-semi-active transitions, or a combination thereof.

The volume mode controller 100 may use the trackers 136 to generate one or more reports about the efficiency of mode transitions within each storage node of the set of storage nodes 103. Further, the volume mode controller 100 may collect the data identified by the trackers 136 at various intervals (e.g., every 3 minutes, every 5 minutes, every 10 minutes, etc.) and archive this data for future use.

Figure 2:
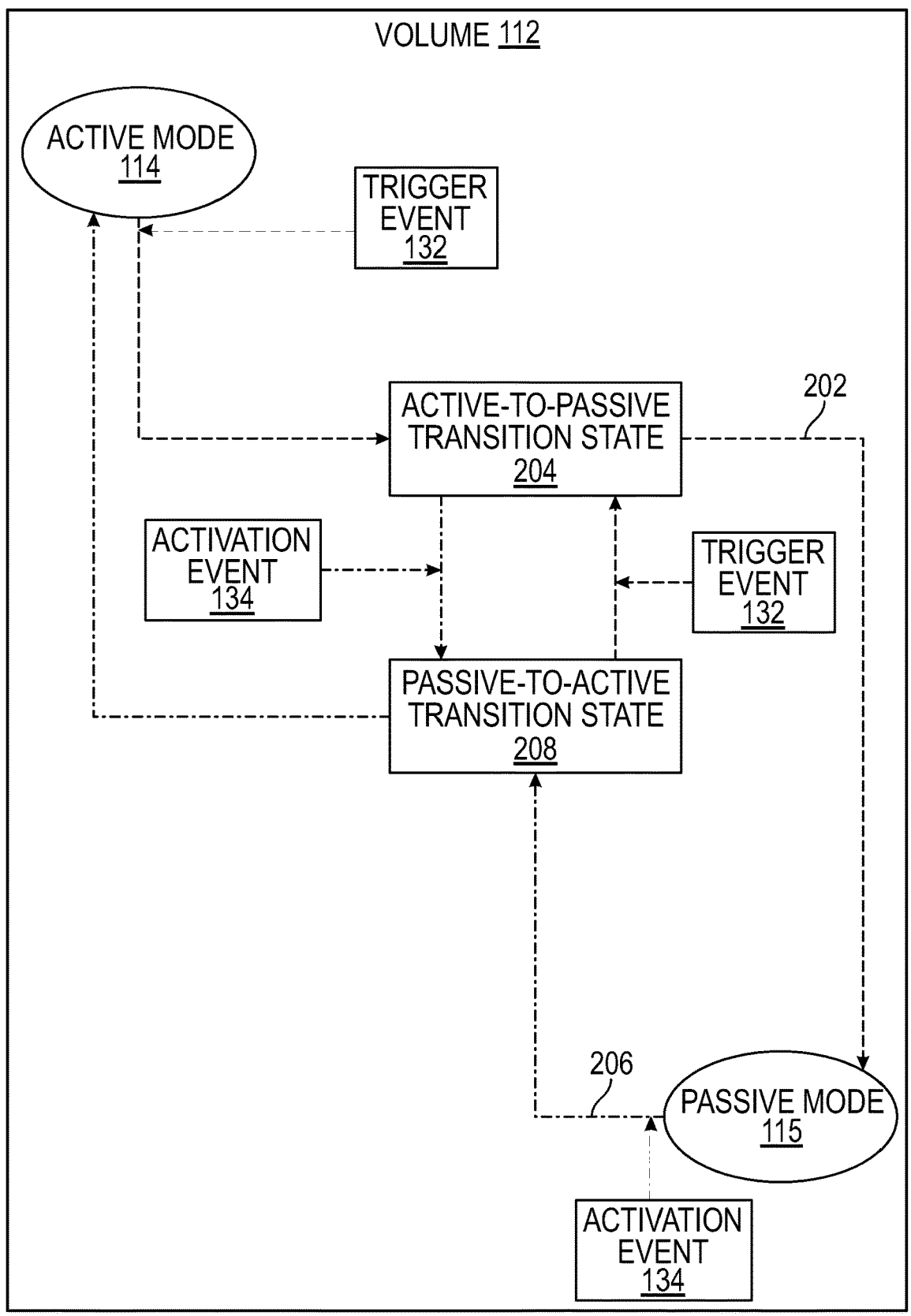
FIG. 2 is a block diagram illustrating transitioning between different modes of operation for a volume in accordance with one or more example embodiments.

FIG. 2 is a block diagram illustrating the transitioning between different modes of operation for the volume 112 from FIG. 1 in accordance with one or more example embodiments. The transitioning process described herein is one example of a manner in which the mode of operation 110 for volume 112, as described with respect to FIG. 1, may be managed and transitioned between different ones of modes 113 in FIG. 1. Thus, FIG. 2 is described with ongoing reference to the elements described with respect to FIG. 1.

In one or more embodiments, the volume 112 is transitioned from the active mode 114 to the passive mode 115 in response to a trigger event 132. As previously described, the trigger event 132 may be the activity score 130 for the volume 112 dropping below a selected threshold. When the volume mode controller 100 of FIG. 1 detects the trigger event 132, an active-to-passive (A2P) transition process 202 is initiated, placing the volume 112 in an active-to-passive (A2P) transition state 204. With the volume 112 in the active-to-passive transition state 204, various actions are performed as part of the active-to-passive transition process 202 to fully transition the volume 112 to the passive mode 115. The volume 112 may still be considered in the active mode 114 while in the active-to-passive transition state 204. Once the active-to-passive transition process 202 has been completed, the volume 112 is considered as being in the passive mode 115.

In one or more embodiments, the active-to-passive transition process 202 includes halting write allocations 118, halting internal activity 120, limiting input/output activity 122, decreasing a priority of the volume 112 with respect to mounting 128, reducing memory usage 126, or a combination thereof. Transitioning the volume 112 from the active mode to the passive mode 115 does not substantially alter the responsiveness 124 of the volume 112 with respect to various client requests (e.g., write requests, snapshot requests, mirror requests, etc.). For example, any delays in responsiveness 124 may be negligible.

Halting write allocations 118 may include, for example, taking a consistency point (CP) if the volume 112 has dirty buffers. Halting internal activity 120 may include, for example, stopping or pausing various internal and background processes. For examples, halting internal activity 120 may include placing scanners in a paused state so as to not lose any checkpoint progress made by the scanners. In some cases, placing scanners in a paused state places the scanners in an idle queue. Further, halting internal activity 120 may include stopping or pausing block free processing activity. In some embodiments, halting internal activity 120 includes sending any global messages corresponding to background processes back into the pool for future processing and ensuring that no new processes (or jobs) are assigned to the volume 112.

When the volume 112 is in the passive mode 115, limiting input/output activity 122 includes allowing read activity (e.g., in response to client read requests) but blocking or otherwise preventing any write activity. However, because the volume 112 is still considered active while in the active-to-passive transition state 204, write activity may still be allowed during the active-to-passive transition process 202 until the volume 112 fully becomes passive.

Reducing memory usage 126 may include, for example, releasing the memory consumed by the internal activity 120 that is halted (e.g., stopped or paused). Decreasing a priority of the volume 112 with respect to mounting 128 includes ensuring that the volume 112, in the passive mode 115, is mounted to a partner storage node (e.g., the other node of a HA pair to which the storage node 104 belongs) after any active volumes have been mounted. In other words, the priority of the volume 112 is decreased with respect to mounting 128 in a high-availability scenario. In some embodiments, the active-to-passive transition process 202 further includes draining internal messages.

In one or more embodiments, the volume 112 is transitioned from the passive mode 115 to the active mode 114 in response to an activation event 134. As previously described, the activation event 134 may be, for example, an incoming write request, a request for a snapshot operation, a request for a mirroring operation, a request for an operation or process identified as critical, another type of request, or a combination thereof. In some cases, the activation event 134 may be the activity score 130 of the volume 112 increasing above a selected threshold (e.g., an active threshold).

When the volume mode controller 100 of FIG. 1 detects the activation event 134, a passive-to-active (P2A) transition process 206 is initiated, placing the volume 112 in a passive-to-active (P2A) transition state 208. Various actions are performed as part of the passive-to-active transition process 206, with the volume 112 in the passive-to-active transition state 208, to fully place the volume 112 in the passive mode 115. The passive-to-active transition process 206 includes resuming write allocations 118, resuming internal activity 120, enabling all input/output activity 122, increasing a priority of the volume 112 with respect to mounting 128, enabling full memory usage 126, or a combination thereof.

In some embodiments, the volume 112 may be considered in the active mode 114 while in the passive-to-active transition state 208. This ensures that certain operations (e.g., incoming write requests, snapshot operations, mirroring operations, etc.) are not delayed while the volume 112 is transitioning. This type of passive-to-active transition process 206 helps ensure that a user or client experiences no substantial delay in how the volume 112 responds to requests for these types of operations.

In other examples, the volume 112 may be considered in the passive mode 115 while in the passive-to-active transition state 208. In these other examples, once the passive-to-active transition process 208 has been completed, the volume 112 is then considered as being in the active mode 114.

In certain instances, an activation event 134 is detected while the volume 112 is undergoing the active-to-passive transition process 202. In these instances, the active-to-passive transition process 202 is halted and the passive-to-active transition process 206 described above is initiated. Initiating the passive-to-active transition process 206 causes the volume 112 to enter the passive-to-active transition state 208.

In other instances, a trigger event 132 is detected while the volume 112 is undergoing the passive-to-active transition process 206. In these instances, the passive-to-active transition process 206 is halted and the active-to-passive transition process 202 as described above is initiated. Initiating the active-to-passive transition process 202 causes the volume 112 to enter the active-to-passive-transition state 204.

In one or more embodiments, the passive-to-active transition process 206 is only initiated in response to an activation event 134 when the number of volumes in the active mode 114 is within limits. For example, in response to detecting the activation event 134, the volume mode controller 100 may initiate the passive-to-active transition process 206 if the number of volumes in the active mode 114 is below (or at) an active volume threshold. The active volume threshold may be, for example, a maximum active volume threshold based on a maximum number of active volumes allowed at any point in time or a maximum ratio of active to passive volumes allowed at any point in time.

If the number of volumes in the active mode 114 is above (or at) the maximum active volume threshold, the volume mode controller 100 may suspend operations associated with the activation event 134 and wait to initiate the passive-to-active transition process 206 until the number of volumes in the active mode 114 decreases to at or below the active volume threshold. For example, the volume mode controller 100 may wait until the resource reclaimer 133 has reclaimed additional resources to handle the volume 112 being transitioned into the active mode 114 by transitioning one or more volumes from the active mode 114 to the passive mode 115. Once the resources have been reclaimed such that the number of volumes in the active mode 114 has decreased to within limits, operations associated with the activation event 134, such as the passive-to-active transition process 206, may be resumed.

In some cases, the number of active volumes may be beyond the maximum number of active volumes when an activation event 134 is detected during an active-to-passive transition process 202. Any operations corresponding to the activation event 134 are suspended until the number of active volumes falls within limits. In some cases, the activation event 134 may "time out" while waiting for the number of active volumes to be within limits. When such a timeout occurs, the active-to-passive transition process 204 is completed, and the operations associated with the activation event 134 are resumed upon the number of active volumes falling within limits.

In one or more embodiments, the transitioning of the volume 112 from the passive mode 115 to the active mode 114 constitutes a trigger event 132 that causes an active volume to transition to a passive volume. In some examples, this transition of an active volume to a passive volume is automatic and initiated by the resource reclaimer 133. For example, the active volume having the lowest activity score 130 may be transitioned to a passive volume. In other examples, this type of transition is performed when the activity score 130 of the active volume has dropped below a selected threshold (e.g., a passive threshold) and is postponed when no volumes have an activity score below the passive threshold.

Figure 3:
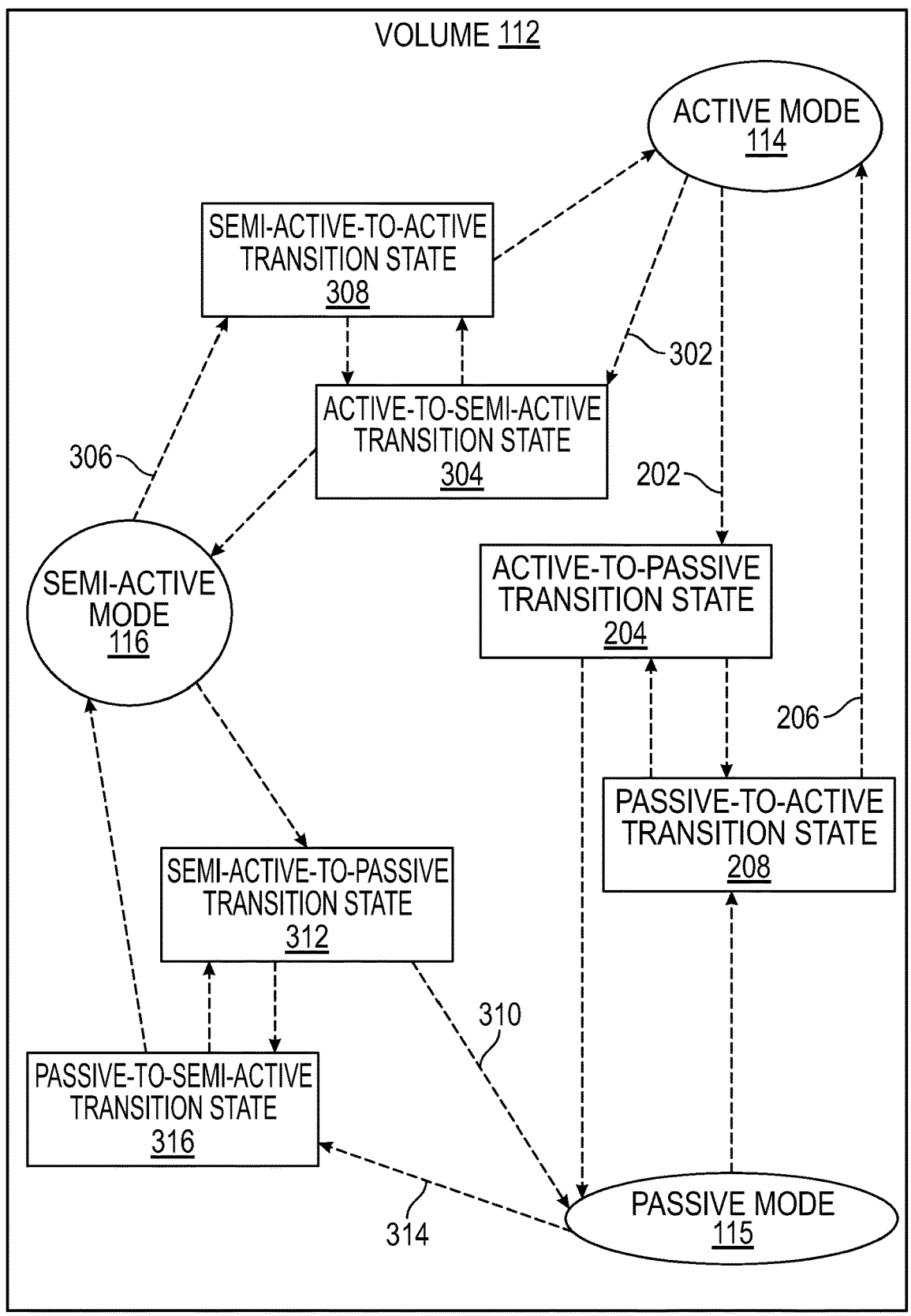
FIG. 3 is a block diagram illustrating transitioning between different modes of operation for a volume in accordance with one or more example embodiments.

FIG. 3 is a block diagram illustrating the transitioning between different modes of operation for the volume 112 from FIG. 1 in accordance with one or more example embodiments. The transitioning process described herein is one example of a manner in which the mode of operation 110 for volume 112, as described with respect to FIG. 1, may be managed and transitioned between different ones of modes 113 in FIG. 1. Thus, FIG. 3 is described with ongoing reference to the elements described with respect to FIG. 1. The transitioning described in FIG. 3 may be implemented in a manner similar to the transitioning described in FIG. 2, but with three different modes: the active mode 114, the passive mode 115, and the semi-active mode 116.

In one or more embodiments, the volume 112 may be transitioned between the active mode 114 and the passive mode 115 in a manner similar to the manner described above with respect to FIG. 2. However, the volume mode controller 100 takes into account additional information to determine when the active mode 114 should be changed to the semi-active mode 116 instead of the passive mode 115 and when the passive mode 115 should be changed to the semi-active mode 116 instead of the active mode 114. The semi-active mode 116 may be considered a hybrid mode in that it includes aspects from both the active mode 114 and the passive mode 115.

When the volume 112 is in the semi-active mode 116, input/output activity 122 may be fully enabled but internal activity 120 may be halted. Thus, in the semi-active mode 116, the volume 112 consumes more resources than in the passive mode 115 but fewer resources than in the active mode 114. Accordingly, the semi-active mode 116 may enable a greater overall amount of input/output activity to be performed within the storage node 104 as compared to when only the active mode 114 and the passive mode 115 are used.

The volume mode controller 100 may transition the volume 112 from the active mode 114 to the semi-active mode 116 when the activity score 130 of the volume 112 is below a first selected threshold (or an active threshold) but above a second selected threshold (a passive threshold) used for the passive mode 115. For example, without limitation, the activity score 130 may be normalized to have a value between 0 and 1. When the activity score 130 is below about 0.5 (the passive threshold), the active-to-passive transition process 202 may be initiated and the volume 112 placed in the active-to-passive transition state 204. However, when the activity score 130 is below 0.75 (the active threshold) but greater than or equal to 0.5 (the passive threshold), an active-to-semi-active transition process 302 may be initiated and the volume 112 placed in the active-to-semi-active transition state 304 until the volume 112 is fully transitioned to the active mode 114.

During the active-to-semi-active transition process 302, internal activity 120 is halted. In some embodiments, one or more other actions may also be taken.

The volume mode controller 100 may transition the volume 112 from the semi-active mode 116 to the active mode 114 when the activity score 130 of the volume 112 is at or above the active threshold. Using the example above, a semi-active-to-active transition process 306 may be initiated when the activity score 130 is increased to or above 0.75, with the volume 112 being placed in the semi-active-to-active transition state 308. During the semi-active-to-active transition process 306, internal activity 120 is resumed. In some embodiments, one or more other actions may also be taken.

The volume mode controller 100 may transition the volume 112 from the semi-active mode 116 to the passive mode 115 when the activity score 130 of the volume 112 is below the passive threshold. Again, using the example above, a semi-active-to-passive transition process 310 may be initiated when the activity score 130 is reduced to below 0.5, with the volume 112 being placed in the semi-active-to-passive transition state 312. During the semi-active-to-passive transition process 310, input/output activity 122 is limited to reading activity. In some embodiments, one or more other actions may also be taken.

Further, the volume mode controller 100 may transition the volume 112 from the passive mode 115 to the semi-active mode 116 when the activity score 130 of the volume 112 increases beyond the passive threshold but is still below the active threshold. Again, using the example above, a passive-to-semi-active transition process 314 may be initiated when the activity score 130 is increased to at or above 0.5 but is below 0.75, with the volume 112 being placed in the passive-to-semi-active transition state 316. During the passive-to-semi-active transition process 314, input/output activity 122 may be increased to include write activity. In some embodiments, one or more other actions may also be taken.

Although the transitioning described above occurs based on the activity score 130 for the volume 112, in other embodiments, one or more other factors may be taken into account instead of or in place of the activity score 130 to determine when the various transition processes are to be initiated. For example, other types of trigger events, activation events, or both may be used to control the transitioning between the different modes of operations.

FIG. 4 is a flow diagram of a process 400 for managing the modes of operation for volumes within a node (e.g., a storage node) in accordance with one or more example embodiments. The process 400 may be implemented by using, for example, the volume mode controller 100 described with respect to FIGS. 1-3. It is understood that additional actions or operations can be provided before, during, or after the actions or operations of the process 400, and that some of the actions or operations described can be replaced or eliminated in other embodiments of the process 400.

The process 400 begins by selecting a first portion of a plurality of volumes in the node to operate in an active mode (operation 402). As described earlier, a volume in the active mode may be fully privileged or fully functional. As example, a volume in the active mode may be enabled to handle write activity and read activity, write allocations, and internal activity. The active mode may be, for example, implemented similarly to the active mode 114 described with respect to FIGS. 1-3.

The process 400 further includes selecting a second portion of the plurality of volumes in the node to operate in a passive mode (operation 404). In operation 404, the second portion of the plurality of volumes that operates in the passive mode consumes fewer resources than the first portion of the plurality of volumes that operates in the active mode. As described earlier, a volume in the passive mode may be partially privileged or partially functional. For example, internal activity is halted (e.g., stopped or paused) and input/output activity is reduced to reading for a volume in the passive mode (a passive volume). Further, a volume in the passive mode has reduced memory usage as compared to a volume in the active mode. In other words, the passive volume has a smaller memory footprint than the active volume. The passive mode may be, for example, implemented similarly to the passive mode 115 described with respect to FIGS. 1-3.

The process 400 further includes adjusting the first portion of the volumes and the second portion of the volumes based on activity of each of the volumes in the plurality of volumes over time (operation 406). Operation 406 may include, for example, transitioning one or more volumes from the active mode to the passive mode, transitioning one or more volumes from the passive mode to the active mode, or both, over time. This transitioning may be performed according to one or more of the various embodiments described herein.

Figure 5:
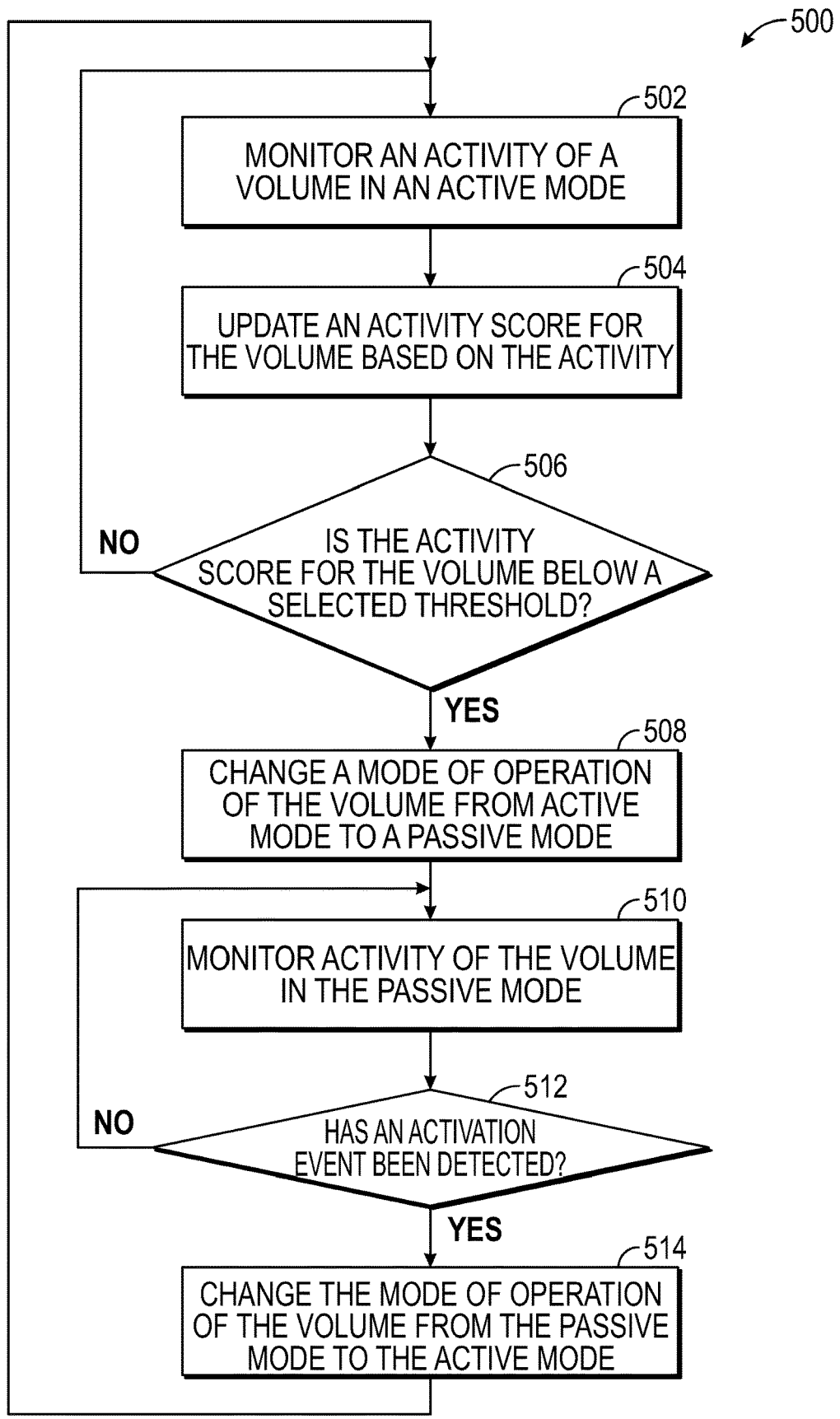
FIG. 5 is a flow diagram of a process for managing the mode of operation of a volume in accordance with one or more example embodiments.

FIG. 5 is a flow diagram of a process 500 for managing the mode of operation for a volume in accordance with one or more example embodiments. The process 500 may be implemented by using, for example, the volume mode controller 100 described with respect to FIG. 1. It is understood that additional actions or operations can be provided before, during, or after the actions or operations of the process 500, and that some of the actions or operations described can be replaced or eliminated in other embodiments of the process 500.

The process 500 begins by monitoring activity of a volume in an active mode (operation 502). The activity may include, for example, input/output activity, internal activity (e.g., block free processing, scans, background processes, etc.), or both. An activity score is updated for the volume based on the activity (operation 504). Operation 504 may include, for example, adjusting the activity score or leaving the activity score as is. Adjusting the activity score includes increasing the activity score or decreasing the activity score. The activity score may take into account, for example, without limitation, input/out activity and internal activity. In some cases, the activity score may specifically take into account write activity and internal activity.

A determination is made as to whether the activity score for the volume is below a selected threshold (operation 506). This selected threshold may be referred to as a passive threshold. If the activity score is not below the selected threshold, the process returns to operation 502 described above. If, however, the activity score is below the selected threshold, a mode of operation of the volume is changed from the active mode to a passive mode (operation 508).

Activity of the volume in the passive mode is monitored (operation 510). A determination is made as to whether an activation event has been detected (operation 512). If an activation event has not been detected, the process returns to operation 510 described above. If, however, an activation event is detected, a mode of operation of the volume is changed from the passive mode to the active mode (operation 514), with the process terminating thereafter.

Figure 6:
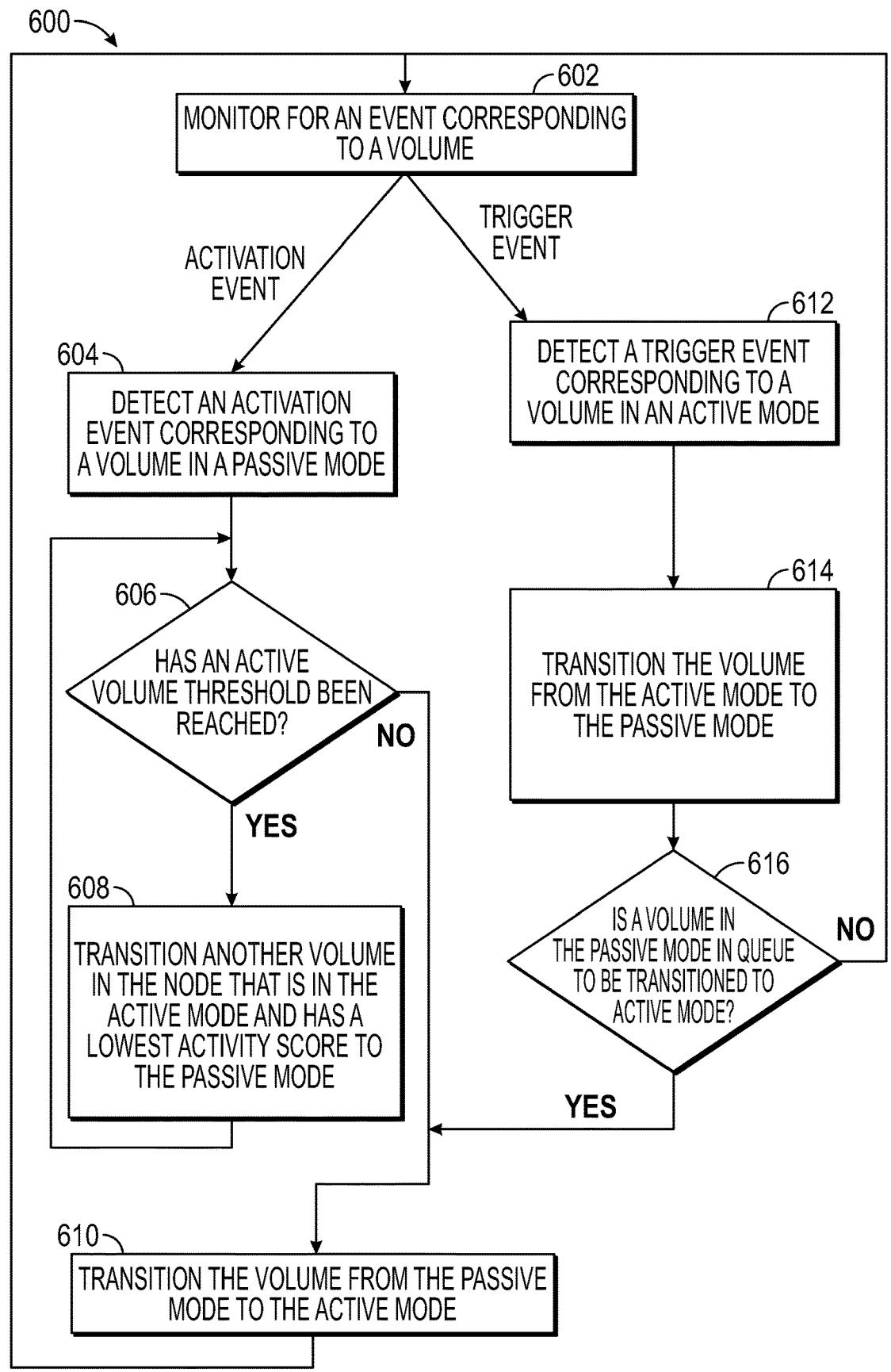
FIG. 6 is a flow diagram of a process for managing the mode of operation of a volume in accordance with one or more example embodiments.

FIG. 6 is a flow diagram of a process 600 for managing the mode of operation of a volume in accordance with one or more example embodiments. The process 600 may be implemented by using, for example, the volume mode controller 100 described with respect to FIG. 1. It is understood that additional actions or operations can be provided before, during, or after the actions or operations of the process 600, and that some of the actions or operations described can be replaced or eliminated in other embodiments of the process 600.

The process 600 begins by monitoring for an event corresponding to a volume (operation 602). The event may be an activation event or a trigger event. In one or more embodiments, an activation event corresponding to a volume in a passive mode is detected (operation 604). The activation event may be, for example, activation event 134 described with respect to FIG. 1. In response to detecting the activation event, a determination is made as to whether an active volume threshold has been reached (operation 606). This active volume threshold may be, for example, a maximum number of volumes that are allowed to be in an active mode at any given point in time.

If the active volume threshold has been reached, the process 600 transitions another volume in the node that is in the active mode and has a lowest activity score to the passive mode (operation 608), the process 600 then returning to operation 606 described above. If the active volume threshold has not been reached, the volume is transitioned from the passive mode to the active mode (operation 610), with the process then returning to operation 602 described above.

With reference again to operation 602, in one or more embodiments, a trigger event corresponding to a volume in an active mode is detected (operation 612). The trigger event may be, for example, the trigger event 132 described with respect to FIG. 1. In response to detecting the trigger event, the volume is transitioned from the active mode to the passive mode (operation 614). Thereafter, a determination is made as to whether a volume in the passive mode is in queue to be transitioned to active mode (operation 616). If no volumes are in queue, the process 600 returns to operation 602 described above. Otherwise, the process 600 proceeds to operation 610 described above.

Figure 7:
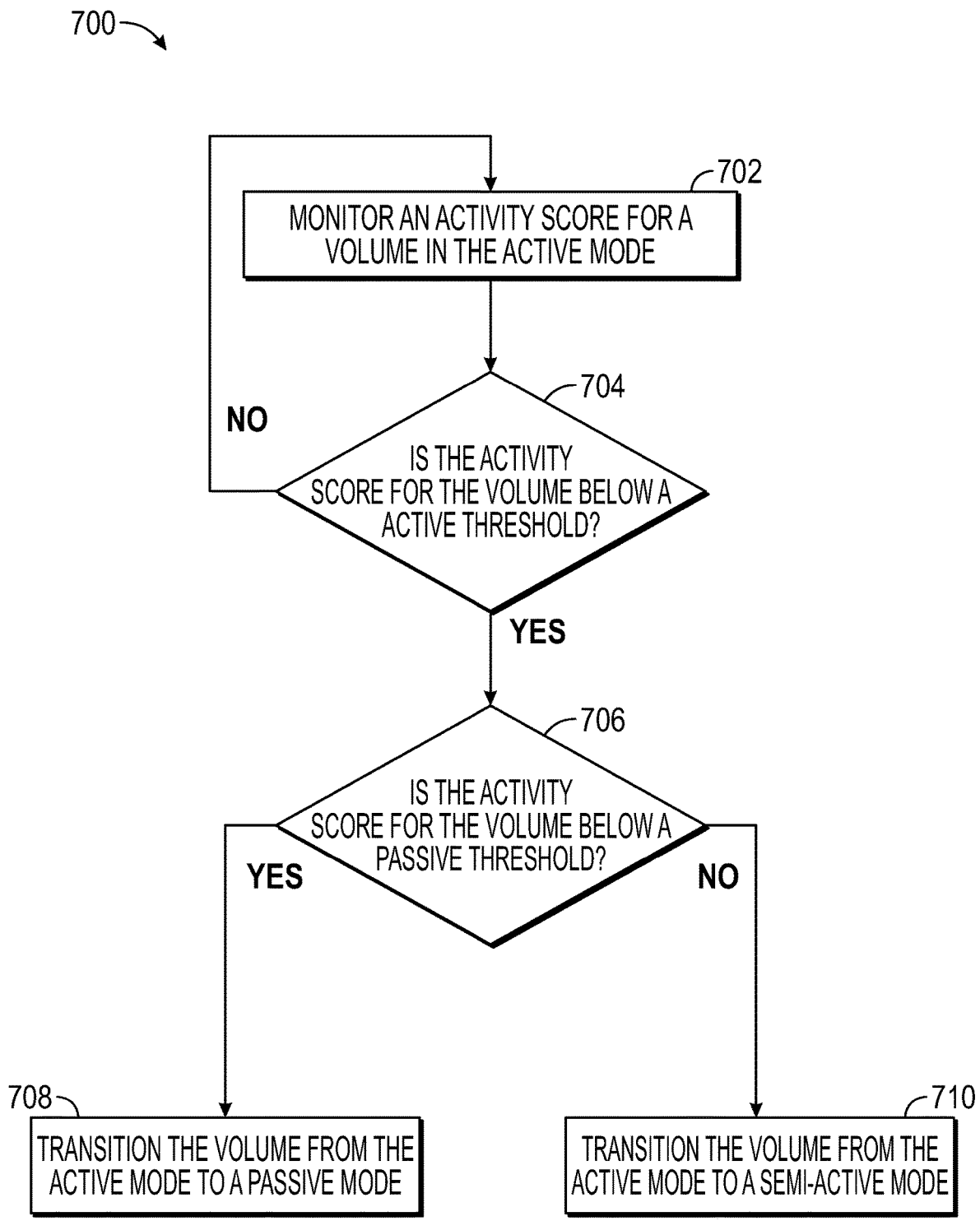
FIG. 7 is a flow diagram of a process for managing the mode of operation of a volume in accordance with one or more example embodiments.

FIG. 7 is a flow diagram of a process 700 for managing the mode of operation of a volume in accordance with one or more example embodiments. The process 700 may be implemented by using, for example, the volume mode controller 100 described with respect to FIG. 1. It is understood that additional actions or operations can be provided before, during, or after the actions or operations of the process 700, and that some of the actions or operations described can be replaced or eliminated in other embodiments of the process 700.

The process 700 begins by monitoring an activity score for a volume in the active mode (operation 702). A determination is made as to whether the activity score is below an active threshold (operation 704). If the activity score is not below the active threshold, the process 700 returns to operation 702 described above. Otherwise, a determination is made as to whether the activity score is below a passive threshold (operation 706). If the activity score is below the passive threshold, the volume is transitioned from the active mode to the passive mode (operation 708). Otherwise, the volume is transitioned from the active mode to a semi-active mode (operation 710).

Figure 8:
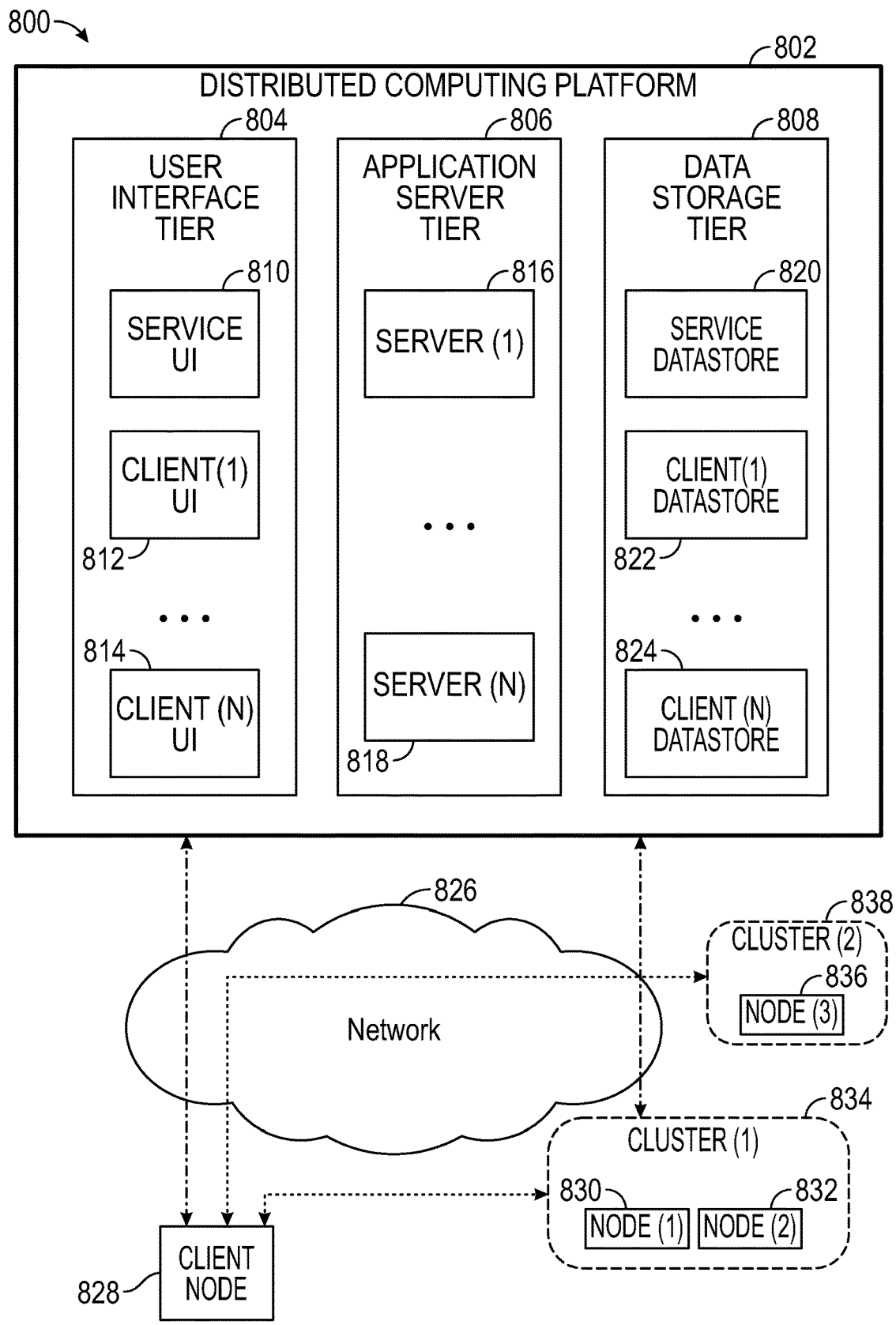
FIG. 8 is a diagram illustrating a computing environment in accordance with one or more example embodiments.

FIG. 8 is a diagram illustrating a computing environment 800 in accordance with one or more example embodiments. In one example, the techniques described herein may include actions implemented within a client node 828, which may take the form of, for example, a laptop, a tablet, a personal computer, a mobile device, a server, a virtual machine, a wearable device, or some other type of client device. In another example, the embodiments described above may include actions (e.g., actions by the volume mode controller 100 in FIG. 1) implemented within one or more nodes, such as a first node 830 and/or a second node 832 within a first cluster 834, a third node 836 within a second cluster 838, or some other combination of nodes. A node may comprise a storage controller, a server, an on-premise device, a virtual machine such as a storage virtual machine, hardware, software, or combination thereof. The one or more nodes may be configured to manage the storage and access to data on behalf of the client node 828 and/or other client devices. In another example, the techniques described herein may be implemented within a distributed computing platform 802 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein include actions implemented across one or more of the client node 828, the one or more nodes 830, 832, and/or 836, and/or the distributed computing platform 802. For example, the client node 828 may transmit operations, such as data operations to read data and write data and metadata operations (e.g., a create file operation, a rename directory operation, a resize operation, a set attribute operation, etc.), over a network 826 to the first node 830 for implementation by the first node 830 upon storage. The first node 830 may store data associated with the operations within volumes or other data objects/structures hosted within locally attached storage, remote storage hosted by other computing devices accessible over the network 826, storage provided by the distributed computing platform 802, etc. The first node 830 may replicate the data and/or the operations to other computing devices, such as to the second node 832, the third node 836, a storage virtual machine executing within the distributed computing platform 802, etc., so that one or more replicas of the data are maintained. For example, the third node 836 may host a destination storage volume that is maintained as a replica of a source storage volume of the first node 830. Such replicas can be used for disaster recovery and failover.

In an embodiment, the techniques described herein include actions implemented by a storage operating system or are implemented by a separate module that interacts with the storage operating system. The storage operating system may be hosted by the client node 828, the distributed computing platform 802, or across a combination thereof. In an example, the storage operating system may execute within a storage virtual machine, a hyperscaler, or some other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 830, a cloud object stored by the distributed computing platform 802, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write-anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks, and inodes are used to identify files and file attributes such as creation time, access permissions, size and block location, etc.).

In an example, deduplication may be implemented by a deduplication module associated with the storage operating system to improve storage efficiency. For example, inline deduplication may ensure blocks are deduplicated before being written to a storage device. Inline deduplication uses a data structure, such as an in-core hash store, which maps fingerprints of data-to-data blocks of the storage device storing the data. Whenever data is to be written to the storage device, a fingerprint of that data is calculated, and the data structure is looked up using the fingerprint to find duplicates (e.g., potentially duplicate data already stored within the storage device). If duplicate data is found, then the duplicate data is loaded from the storage device and a byte-by-byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

In an example, various types of synchronization may be implemented by a synchronization module associated with the storage operating system. In an example, synchronous replication may be implemented, such as between the first node 830 and the second node 832. It may be appreciated that the synchronization module may implement synchronous replication between any devices within the computing environment 800, such as between the first node 830 of the first cluster 834 and the third node 836 of the second cluster 838 and/or between a node of a cluster and an instance of a node or virtual machine in the distributed computing platform 802.

As an example, during synchronous replication, the first node 830 may receive a write operation from the client node 828. The write operation may target a file stored within a volume managed by the first node 830. The first node 830 replicates the write operation to create a replicated write operation. The first node 830 locally implements the write operation upon the file within the volume. The first node 830 also transmits the replicated write operation to a synchronous replication target, such as the second node 832 that maintains a replica volume as a replica of the volume maintained by the first node 830. The second node 832 will execute the replicated write operation upon the replica volume so that file within the volume and the replica volume comprises the same data. After, the second node 832 will transmit a success message to the first node 830. With synchronous replication, the first node 830 does not respond with a success message to the client node 828 for the write operation until the write operation is executed upon the volume and the first node 830 receives the success message that the second node 832 executed the replicated write operation upon the replica volume.

In another example, asynchronous replication may be implemented, such as between the first node 830 and the third node 836. It may be appreciated that the synchronization module may implement asynchronous replication between any devices within the computing environment 800, such as between the first node 830 of the first cluster 834 and the distributed computing platform 802. In an example, the first node 830 may establish an asynchronous replication relationship with the third node 836. The first node 830 may capture a baseline snapshot of a first volume as a point in time representation of the first volume. The first node 830 may utilize the baseline snapshot to perform a baseline transfer of the data within the first volume to the third node 836 in order to create a second volume within the third node 836 comprising data of the first volume as of the point in time at which the baseline snapshot was created.

After the baseline transfer, the first node 830 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 830 may store data or a portion thereof within storage hosted by the distributed computing platform 802 by transmitting the data within objects to the distributed computing platform 802. In one example, the first node 830 may locally store frequently accessed data within locally attached storage. Less frequently accessed data may be transmitted to the distributed computing platform 802 for storage within a data storage tier 808. The data storage tier 808 may store data within a service data store 820. Further, the data storage tier 808 may store client specific data within client data stores assigned to such clients such as a client (1) data store 822 used to store data of a client (1) and a client (N) data store 824 used to store data of a client (N). The data stores may be physical storage devices or may be defined as logical storage, such as a virtual volume, logical unit numbers (LUNs), or other logical organizations of data that can be defined across one or more physical storage devices. In another example, the first node 830 transmits and stores all client data to the distributed computing platform 802. In yet another example, the client node 828 transmits and stores the data directly to the distributed computing platform 802 without the use of the first node 830.

The management of storage and access to data can be performed by one or more storage virtual machines (SVMs) or other storage applications that provide software as a service (SaaS) such as storage software services. In one example, an SVM may be hosted within the client node 828, within the first node 830, or within the distributed computing platform 802 such as by the application server tier 806. In another example, one or more SVMs may be hosted across one or more of the client node 828, the first node 830, and the distributed computing platform 802. The one or more SVMs may host instances of the storage operating system.

In an example, the storage operating system may be implemented for the distributed computing platform 802. The storage operating system may allow client devices to access data stored within the distributed computing platform 802 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 802, one or more SVMs may be hosted by the application server tier 806. For example, a server (1) 816 is configured to host SVMs used to execute applications such as storage applications that manage the storage of data of the client (1) within the client (1) data store 822. Thus, an SVM executing on the server (1) 816 may receive data and/or operations from the client node 828 and/or the first node 830 over the network 826. The SVM executes a storage application and/or an instance of the storage operating system to process the operations and/or store the data within the client (1) data store 822. The SVM may transmit a response back to the client node 828 and/or the first node 830 over the network 826, such as a success message or an error message. In this way, the application server tier 806 may host SVMs, services, and/or other storage applications using the server (1) 816, the server (N) 818, etc.

A user interface tier 804 of the distributed computing platform 802 may provide the client node 828 and/or the first node 830 with access to user interfaces associated with the storage and access of data and/or other services provided by the distributed computing platform 802. In an example, a service user interface 810 may be accessible from the distributed computing platform 802 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 812, a client (N) user interface 814, etc. The client (1) can access various services and resources subscribed to by the client (1) through the client (1) user interface 812, such as access to a web service, a development environment, a human resource application, a warehouse tracking application, and/or other services and resources provided by the application server tier 806, which may use data stored within the data storage tier 808.

The client node 828 and/or the first node 830 may subscribe to certain types and amounts of services and resources provided by the distributed computing platform 802. For example, the client node 828 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 830 can establish a subscription to have access to certain services and resources of the distributed computing platform 802.

As shown, a variety of clients, such as the client node 828 and the first node 830, incorporating and/or incorporated into a variety of computing devices may communicate with the distributed computing platform 802 through one or more networks, such as the network 826. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 802, such as a multi-tenant business data processing platform or cloud computing environment, may include multiple processing tiers, including the user interface tier 804, the application server tier 806, and a data storage tier 808. The user interface tier 804 may maintain multiple user interfaces, including graphical user interfaces and/or web-based interfaces. The user interfaces may include the service user interface 810 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 810 may include components enabling a tenant to administer the tenant's participation in the functions and capabilities provided by the distributed computing platform 802, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 808 may include one or more data stores, which may include the service data store 820 and one or more client data stores 822-824. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 802 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 9:
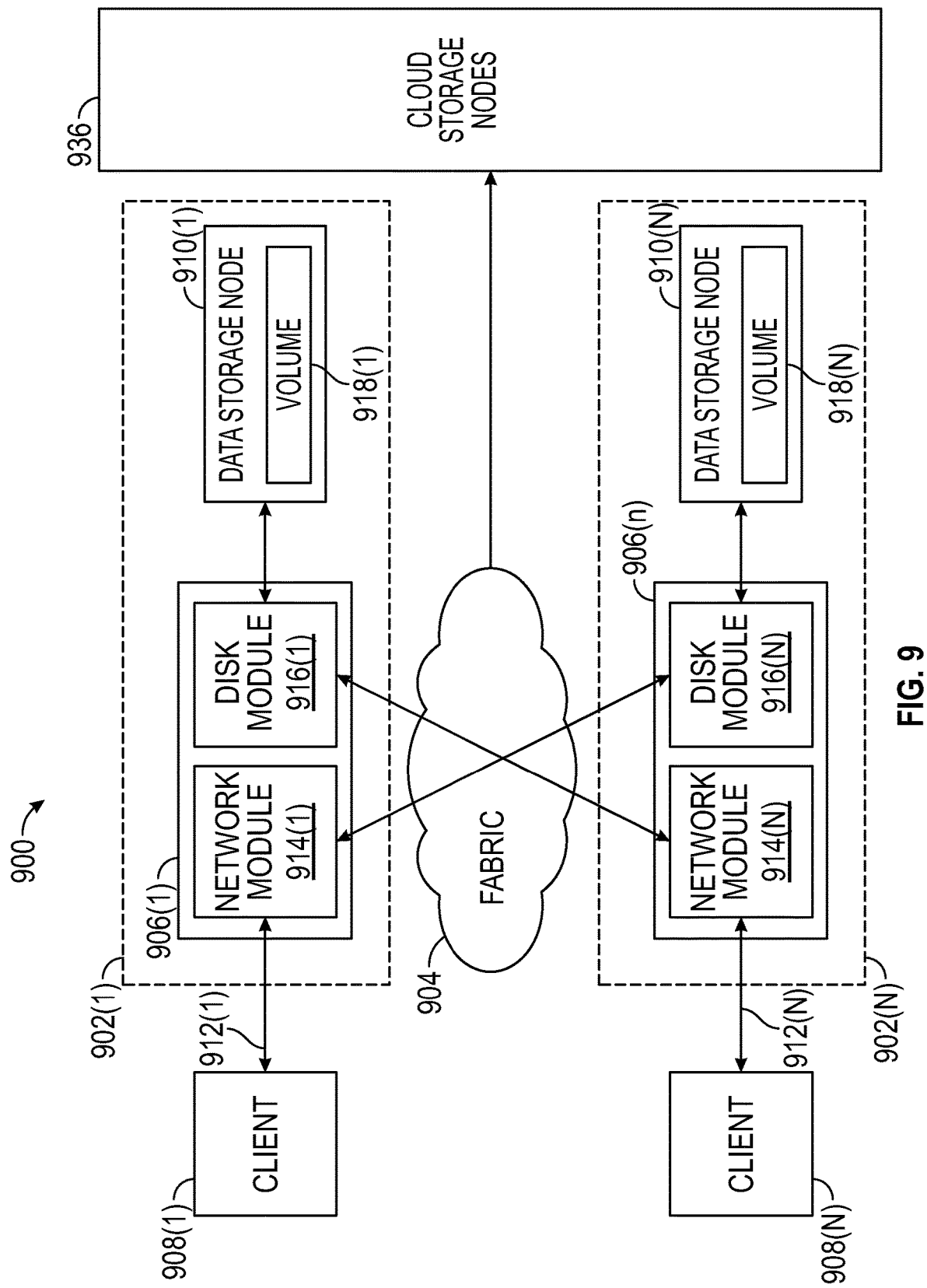
FIG. 9 is a block diagram illustrating a network environment in accordance with one or more example embodiments.

FIG. 9 is a block diagram illustrating a network environment 900 in accordance with one or more example embodiments. The network environment 900 illustrates another architecture for the principles described above with respect to FIG. 8. Furthermore, the embodiments described above may be implemented with use of a volume mode controller (such as the volume mode controller 100 described with respect to FIG. 1) implemented within a storage node, such as any single or multiple ones of the data storage apparatuses 902(1)-902(n) of FIG. 9. For example, the volume mode controller may be used to control the mode of operation for each of the volumes within data storage nodes 910(1)-910(n) (e.g., in each of volumes 918(1)-918(n).

The network environment 900, which may take the form of a clustered network environment, includes data storage apparatuses 902(1)-902(n) that are coupled over a cluster or cluster fabric 904 that includes one or more communication network(s) and facilitates communication between the data storage apparatuses 902(1)-902(n) (and one or more modules, components, etc. therein, such as, node computing devices 906(1)-906(n) (also referred to as node computing devices), for example), although any number of other elements or components can also be included in the network environment 900 in other examples. This technology provides a number of advantages including methods, non-transitory computer-readable media, and computing devices that implement the techniques described herein.

In this example, node computing devices 906(1)-906(n) can be primary or local storage controllers or secondary or remote storage controllers that provide client devices 908(1)-908(n) (also referred to as client nodes) with access to data stored within data storage nodes 910(1)-910(n) (also referred to as data storage devices) and cloud storage node(s) 936 (also referred to as cloud storage device(s)). The node computing devices 906(1)-906(n) may be implemented as hardware, software (e.g., a storage virtual machine), or combination thereof.

The data storage apparatuses 902(1)-902(n) and/or node computing devices 906(1)-906(n) of the examples described and illustrated herein are not limited to any particular geographic areas and can be clustered locally and/or remotely via a cloud network, or not clustered in other examples. Thus, in one example the data storage apparatuses 902(1)-902(n) and/or node computing device 906(1)-906(n) can be distributed over a plurality of storage systems located in a plurality of geographic locations (e.g., located on-premise, located within a cloud computing environment, etc.); while in another example a network can include data storage apparatuses 902(1)-902(n) and/or node computing device 906(1)-906(n) residing in a same geographic location (e.g., in a single on-site rack).

In the illustrated example, one or more of the client devices 908(1)-908(n), which may be, for example, personal computers (PCs), computing devices used for storage (e.g., storage servers), or other computers or peripheral devices, are coupled to the respective data storage apparatuses 902(1)-902(n) by network connections 912(1)-912(n). Network connections 912(1)-912(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 908(1)-908(n) may be general-purpose computers running applications and may interact with the data storage apparatuses 902(1)-902(n) using a client/server model for exchange of information. That is, the client devices 908(1)-908(n) may request data from the data storage apparatuses 902(1)-902(n) (e.g., data on one of the data storage nodes 910(1)-910(n) managed by a network storage controller configured to process I/O commands issued by the client devices 908(1)-908(n)), and the data storage apparatuses 902(1)-902(n) may return results of the request to the client devices 908(1)-908(n) via the network connections 912(1)-912(n).

The node computing devices 906(1)-906(n) of the data storage apparatuses 902(1)-902(n) can include network or host nodes that are interconnected as a cluster to provide data storage and management services, such as to an enterprise having remote locations, cloud storage (e.g., a storage endpoint may be stored within cloud storage node(s) 936), etc., for example. Such node computing devices 906(1)-906(n) can be attached to the cluster fabric 904 at a connection point, redistribution point, or communication endpoint, for example. One or more of the node computing devices 906(1)-906(n) may be capable of sending, receiving, and/or forwarding information over a network communications channel, and could comprise any type of device that meets any or all of these criteria.

In an example, the node computing devices 906(1) and 906(n) may be configured according to a disaster recovery configuration whereby a surviving node provides switchover access to the storage devices 910(1)-910(n) in the event a disaster occurs at a disaster storage site (e.g., the node computing device 906(1) provides client device 908(n) with switchover data access to data storage nodes 910(n) in the event a disaster occurs at the second storage site). In other examples, the node computing device 906(n) can be configured according to an archival configuration and/or the node computing devices 906(1)-906(n) can be configured based on another type of replication arrangement (e.g., to facilitate load sharing). Additionally, while two node computing devices are illustrated in FIG. 9, any number of node computing devices or data storage apparatuses can be included in other examples in other types of configurations or arrangements.

As illustrated in the network environment 900, node computing devices 906(1)-906(n) can include various functional components that coordinate to provide a distributed storage architecture. For example, the node computing devices 906(1)-906(n) can include network modules 914(1)-914(n) and disk modules 916(1)-916(n). Network modules 914(1)-914(n) can be configured to allow the node computing devices 906(1)-906(n) (e.g., network storage controllers) to connect with client devices 908(1)-908(n) over the network connections 912(1)-912(n), for example, allowing the client devices 908(1)-908(n) to access data stored in the network environment 900.

Further, the network modules 914(1)-914(n) can provide connections with one or more other components through the cluster fabric 904. For example, the network module 914(1) of node computing device 906(1) can access the data storage node 910(n) by sending a request via the cluster fabric 904 through the disk module 916(n) of node computing device 906(n) when the node computing device 906(n) is available. Alternatively, when the node computing device 906(n) fails, the network module 914(1) of node computing device 906(1) can access the data storage node 910(n) directly via the cluster fabric 904. The cluster fabric 904 can include one or more local and/or wide area computing networks (i.e., cloud networks) embodied as Infiniband, Fibre Channel (FC), or Ethernet networks, for example, although other types of networks supporting other protocols can also be used.

Disk modules 916(1)-916(n) can be configured to connect data storage nodes 910(1)-910(n), such as disks or arrays of disks, SSDs, flash memory, or some other form of data storage, to the node computing devices 906(1)-906(n). Often, disk modules 916(1)-916(n) communicate with the data storage nodes 910(1)-910(n) according to the SAN protocol, such as SCSI or FCP, for example, although other protocols can also be used. Thus, as seen from an operating system on node computing devices 906(1)-906(n), the data storage nodes 910(1)-910(n) can appear as locally attached. In this manner, different node computing devices 906(1)-906(n), etc. may access data blocks, files, or objects through the operating system, rather than expressly requesting abstract files.

While the network environment 900 illustrates an equal number of network modules 914(1)-914(n) and disk modules 916(1)-916(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 908(1)-908(n) can be networked with the node computing devices 906(1)-906(n) in the cluster, over the network connections 912(1)-912(n). As an example, respective client devices 908(1)-908(n) that are networked to a cluster may request services (e.g., exchanging of information in the form of data packets) of node computing devices 906(1)-906(n) in the cluster, and the node computing devices 906(1)-906(n) can return results of the requested services to the client devices 908(1)-908(n). In one example, the client devices 908(1)-908(n) can exchange information with the network modules 914(1)-914(n) residing in the node computing devices 906(1)-906(n) (e.g., network hosts) in the data storage apparatuses 902(1)-902(n).

In one example, the storage apparatuses 902(1)-902(n) host aggregates corresponding to physical local and remote data storage devices, such as local flash or disk storage in the data storage nodes 910(1)-910(n), for example. One or more of the data storage nodes 910(1)-910(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 918(1)-918(n) in this example, although any number of volumes can be included in the aggregates. The volumes 918(1)-918(n) are virtual data stores or storage objects that define an arrangement of storage and one or more filesystems within the network environment 900. Volumes 918(1)-918(n) can span a portion of a disk or other storage device, a collection of disks, or portions of disks, for example, and typically define an overall logical arrangement of data storage. In one example volumes 918(1)-918(n) can include stored user data as one or more files, blocks, or objects that may reside in a hierarchical directory structure within the volumes 918(1)-918(n).

Volumes 918(1)-918(n) are typically configured in formats that may be associated with particular storage systems, and respective volume formats typically comprise features that provide functionality to the volumes 918(1)-918(n), such as providing the ability for volumes 918(1)-918(n) to form clusters, among other functionality. Optionally, one or more of the volumes 918(1)-918(n) can be in composite aggregates and can extend between one or more of the data storage nodes 910(1)-910(n) and one or more of the cloud storage node(s) 936 to provide tiered storage, for example, and other arrangements can also be used in other examples.

In one example, to facilitate access to data stored on the disks or other structures of the data storage nodes 910(1)-910(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage nodes 910(1)-910(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more LUNs, directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage nodes 910(1)-910(n) can have one or more physical ports, wherein each physical port can be assigned a target address (e.g., SCSI target address). To represent respective volumes, a target address on the data storage nodes 910(1)-910(n) can be used to identify one or more of the LUNs. Thus, for example, when one of the node computing devices 906(1)-906(n) connects to a volume, a connection between the one of the node computing devices 906(1)-906(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

The present embodiments can take the form of an entirely hardware embodiment, an entirely software embodiment, or an embodiment containing both hardware and software elements. Accordingly, it is understood that any operation of the computing systems of the computing environment 800, the network environment 900, and the storage node 104 may be implemented by a computing system using corresponding instructions stored on or in a non-transitory computer-readable medium accessible by a processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    selecting a first number of a plurality of volumes in a node to operate in an active mode, the active mode allowing both write activity and read activity;
    selecting a second number of the plurality of volumes in the node to operate in a passive mode, the passive mode allowing read activity and blocking write activity, wherein the second number of the volumes that operates in the passive mode consumes fewer resources than the first number of the volumes that operates in the active mode; and
    adjusting the first number of the plurality of volumes and the second number of the plurality of volumes, by changing at least one volume from the plurality of volumes between the active mode and the passive mode based on activity of each volume of the plurality of volumes over time.

2. The method of claim 1, wherein the adjusting comprises:
    generating an activity score corresponding to each volume of the plurality of volumes in the node, wherein the activity score is based on input/output activity and internal activity.

3. The method of claim 1, wherein the changing comprises:
    changing a mode of operation for the at least one volume in the plurality of volumes from the active mode to the passive mode in response to a determination that an activity score corresponding to the at least one volume is below a selected threshold.

4. The method of claim 1, wherein the changing comprises:
    changing a mode of operation for the at least one volume in the plurality of volumes from the passive mode to the active mode in response to detecting an activation event corresponding to the at least one volume.

5. The method of claim 1, wherein the selecting the second number of the plurality of volumes to operate in the passive mode comprises:
    blocking internal activity and write activity of the at least one volume in the plurality of volumes selected to operate in the passive mode.

6. The method of claim 1, wherein the changing comprises:
    changing a mode of operation for the at least one volume in the plurality of volumes from the active mode to the passive mode, wherein at least a portion of memory used by the at least one volume in the active mode is released when the mode of operation is changed to the passive mode.

7. The method of claim 1, wherein the changing comprises:
    halting write allocations corresponding to the at least one volume in the plurality of volumes to transition the at least one volume from the active mode to the passive mode.

8. The method of claim 1, wherein the changing comprises:
    decreasing a priority of the at least one volume in the plurality of volumes with respect to mounting in a high-availability scenario to transition the at least one volume from the active mode to the passive mode.

9. A non-transitory machine-readable medium having stored thereon instructions for performing a method comprising machine-executable code which, when executed by at least one machine, causes the at least one machine to:
  select a first number of a plurality of volumes in a node to operate in an active mode, the active mode allowing both write activity and internal activity;
  select a second number of the plurality of volumes in the node to operate in a passive mode, the passive mode halting internal activity and write activity in the second number of the volumes such that the second number of the volumes that operate in the passive mode consume fewer resources than the first number of the volumes that operates in the active mode; and
  adjust the first number of the plurality of volumes and the second number of the plurality of volumes by changing at least one volume from the plurality of volumes between the active mode and the passive mode based on activity of each volume of the plurality of volumes over time.

10. The non-transitory machine-readable medium of claim 9, wherein the machine-executable code further causes the at least one machine, as part of the adjusting, to:
  generate an activity score corresponding to each volume of the plurality of volumes in the node, wherein the activity score is based on an input/output activity and internal activity of each volume.

11. The non-transitory machine-readable medium of claim 9, wherein the machine-executable code further causes the at least one machine, as part of the changing, to:
  change a mode of operation for the at least one volume in the plurality of volumes from the active mode to the passive mode in response to a determination that an activity score corresponding to the at least one volume is below a selected threshold.

12. The non-transitory machine-readable medium of claim 9, wherein the machine-executable code further causes the at least one machine, as part of the changing, to:
  change a mode of operation for the at least one volume in the plurality of volumes from the passive mode to the active mode in response detecting an activation event corresponding to the at least one volume, wherein the activation event is a write request.

13. The non-transitory machine-readable medium of claim 9, wherein the machine-executable code further causes the at least one machine, as part of the changing, to:
  change a mode of operation for the at least one volume in the plurality of volumes from the active mode to the passive mode, wherein at least a portion of memory used by the at least one volume in the active mode is released when the mode of operation is changed to the passive mode.

14. The non-transitory machine-readable medium of claim 9, wherein the machine-executable code further causes the at least one machine, as part of the changing, to:
  block write allocations of the at least one volume in the plurality of volumes to transition the at least one volume from the active mode to the passive mode operate in the passive mode.

15. A computing device comprising:
  at least one memory containing machine-readable medium comprising machine-executable code having stored thereon instructions for performing a method of managing modes of operation for a plurality of volumes in a node; and
  a processor coupled to the at least one memory, the processor configured to execute the machine-executable code to cause the processor to:
    select a first number of the plurality of volumes in the node to operate in an active mode, the active mode allowing both write activity and read activity;
    select a second number of the plurality of volumes in the node to operate in a passive mode, the passive mode allowing read activity and blocking write activity, wherein the second number of the volumes that operate in the passive mode consume fewer resources than the first number of the volumes that operates in the active mode; and
    adjust the first number of the plurality of volumes and the second number of the plurality of volumes by changing at least one volume from the plurality of volumes between the active mode and the passive mode based on an activity score generated for each volume of the plurality of volumes over time.

16. The computing device of claim 15, wherein the activity score is based on a write activity and internal activity of each volume.

17. The computing device of claim 15, wherein the machine-executable code to adjust the first number of the plurality of volumes and the second number of the plurality of volumes causes the processor to change a mode of operation for the at least one volume in the plurality of volumes from the active mode to the passive mode in response to a determination that the activity score corresponding to the at least one volume is below a selected threshold.

18. The computing device of claim 15, wherein the machine-executable code to adjust the first number of the plurality of volumes and the second number of the plurality of volumes causes the processor to change a mode of operation for the at least one volume in the plurality of volumes from the passive mode to the active mode in response to a determination that the activity score corresponding to the at least one volume is above a selected threshold.

19. The computing device of claim 15, wherein the machine-executable code to adjust the first number of the plurality of volumes and the second number of the plurality of volumes causes the processor to halt internal activity and write activity of the at least one volume in the plurality of volumes to transition the at least one volume from the active mode to the passive mode.

20. The computing device of claim 15, wherein the machine-executable code to adjust the first number of the plurality of volumes and the second number of the plurality of volumes causes the processor to release a portion of memory used by the at least one volume in the plurality of volumes while operating in the active mode to thereby transition the at least one volume to the passive mode.

* * * * *